United States Patent
Han et al.

(10) Patent No.: US 8,270,974 B2
(45) Date of Patent: Sep. 18, 2012

(54) APPARATUS FOR FAST REACTIVE HANDOVER IN IPV6-BASED MOBILE SYSTEM

(75) Inventors: Youn-Hee Han, Guri-si (KR); Jin-Hyeock Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1071 days.

(21) Appl. No.: 11/448,789

(22) Filed: Jun. 8, 2006

(65) Prior Publication Data
US 2007/0008906 A1    Jan. 11, 2007

Related U.S. Application Data

(60) Provisional application No. 60/688,378, filed on Jun. 8, 2005.

(30) Foreign Application Priority Data

May 18, 2006    (KR) .................. 10-2006-0044682

(51) Int. Cl.
*H04W 4/00* (2009.01)
*H04W 36/00* (2009.01)

(52) U.S. Cl. .................. 455/436; 370/328; 370/338

(58) Field of Classification Search .................. 455/436, 455/460; 370/328, 331, 338
See application file for complete search history.

(56) References Cited

U.S. PATENT DOCUMENTS

| 6,804,221 | B1 * | 10/2004 | Magret et al. | 370/338 |
| 7,599,345 | B2 * | 10/2009 | Zheng et al. | 370/342 |
| 2004/0165565 | A1 * | 8/2004 | Omae et al. | 370/338 |
| 2005/0078635 | A1 * | 4/2005 | Choi et al. | 370/331 |
| 2005/0088994 | A1 * | 4/2005 | Maenpaa et al. | 370/331 |
| 2005/0094641 | A1 * | 5/2005 | Yun et al. | 370/395.2 |
| 2006/0126661 | A1 * | 6/2006 | Zheng et al. | 370/469 |
| 2007/0109997 | A1 * | 5/2007 | Hong et al. | 370/331 |

FOREIGN PATENT DOCUMENTS

KR    2004-0098157    11/2004

OTHER PUBLICATIONS

S.-H. Hwang, Y.-H. Han, S.-G. Min, and C.-S. Hwang; "An Address Configuration and Confirmation Scheme for Seamless Mobility Support in IPv6 Network"; copyright 2004; Springer-Verlag Berlin Heidelberg; pp. 74-86.*

Wang, Maoning; "MANET Global Connectivity and Mobility Management Using HMIPv6 and OLSR"; Ottawa-Carleton Institute for Computer Science; Aug. 23, 2003; pp. 8-12, 42-54, and 65.*

* cited by examiner

*Primary Examiner* — Dwayne Bost
*Assistant Examiner* — Bryan Pitt
(74) *Attorney, Agent, or Firm* — NSIP Law

(57) ABSTRACT

An apparatus for a fast reactive handover in an Internet Protocol version 6 (IPv6) mobile system is provided, in which a message receiver receives a new connection notification message from a point of attachment when the point of attachment makes a new connection with a mobile unit, and a message transmitter sends a router advertisement (RA) message to the mobile unit in response to receiving the new connection notification message.

9 Claims, 5 Drawing Sheets

APPARATUS FOR FAST REACTIVE HANDOVER IN IPV6-BASED MOBILE SYSTEM

CROSS-REFERENCE TO RELATED APPLICATIONS

This application claims the benefit under 35 U.S.C. §119 (e) of U.S. Provisional Application No. 60/688,378, filed on Jun. 8, 2005, in the U.S. Patent and Trademark Office, and under 35 U.S.C. §119(a) of Korean Patent Application No. 10-2006-0044682, filed on May 18, 2006, in the Korean Intellectual Property Office, the entire disclosure of both of which are hereby incorporated by reference.

1. FIELD OF THE INVENTION

The present invention relates to an Internet Protocol version 6 (IPv6)-based mobile system. More particularly, the present invention relates to an apparatus for fast reactive handover in IPv6-based mobile system.

2. DESCRIPTION OF THE RELATED ART

Mobile Internet Protocol version 6 (MIPv6) describes a world-wide Internet Protocol version 6 (IPv6) mobility solution of the Internet Engineering Task Force (IETF) that provides host mobility management for a diverse array of applications and devices on an IPv6-based Internet. It is independent of access network types, and transparent to all transportation methods and applications.

FIG. 1 is a diagram illustrating a conventional MIPv6 network.

A home network 120 comprises a permanent Internet Protocol (IP) address of a mobile host 161. A foreign domain network 130 can be a campus network, company network, or public access network.

According to the MIPv6, each of the mobile hosts 161 and 163 is identified by its static home address (HoA), regardless of their current point of attachments (PoAs) 151, 152, 153, 154, and 155 to the Internet 110. While a mobile host 161 is away from its home network 120, the mobile host 161 sends information about current location to the home agent (HA) 121 on its home link. The home agent 121 intercepts packets addressed to the mobile host 161 and tunnels the packets to the mobile host's current location. The mobile host 161 also registers its temporal location to correspondent nodes (CN) (not shown) every time it moves. After receiving the location information, CN can directly send data packets to the mobile host 161 without help of the mobile host's HA 121.

Recently, personal area network (PAN) and networks in trains, cars, and ships have created a need for handling the mobility of single leaf-networks. When an entire network that is composed of one or several mobile routers and attached network nodes moves as a single unit, there is a need to support the network mobility.

Internet Engineering Task Force's (IETF) Network Mobility (NeMo) protocol supports such a network mobility solution. The ultimate objective of NeMo is to allow all nodes in the mobile network to be reachable via their permanent IPv6 addresses, as well as maintain ongoing sessions when a mobile router 162 changes its PoA 152 within the IPv6 Internet.

Voice over Internet Protocol (VoIP) and audio/video streaming applications that rely on timely packet delivery within a certain acceptable threshold will be sensitive to the length of time a mobile host 161 or a mobile network 160 loses connectivity while performing a handover. Since it is known that MIPv6 itself cannot support a seamless handover, additional optimizations and/or changes to the protocol may be deemed necessary. Thus, new mobility protocols optimized for MIPv6 are currently required. NeMo's handover procedures are the same as MIPv6's handover procedures. Therefore, any IPv6 handover optimization is useful and necessary for both MIPv6 and NeMo.

A mobile host or a mobile router is referred to as a mobile unit (MU) or a mobile node (MN). A mobile host includes a terminal device that has communication capability, such as a mobile phone, laptop computer, PDA, and the like. A mobile router is a router in charge of the MU's moving network.

Some link layer technologies are able to provide advance information about the network the MU 161, 162, and 163 are moving to. In the case where the MU 161, 162, and 163 know their new network's IP addresses, or link layer addresses of the new PoAs, the MU 161, 162, and 163 can make use of proactive handover techniques. Since movement in this case is detected or predicted before the current network connection is broken, the MU 161, 162, and 163 can exchange movement-related signals with the current access routers (ARs) 141 and 142 in order to redirect traffic before the movement is made.

However, this proactive approach is subject to the following restrictions (1) Prediction information may be unreliable. This problem is also known as "erroneous movement." As a result, the MU 161, 162, and 163 receives prediction information prior to a handover that it is moving to the new PoAs 151, 152, 153, 154, and 155, but the MU 161, 162 and 163 are either moved to a different PoA or aborts movement altogether. The effect of erroneous movement typically results in a loss of packets. (2) To provide prediction information, some link technologies (for example, Institute of Electrical and Electronics Engineers (IEEE) 802.11) force the mobile units 161, 162, and 163 to scan and see what PoAs are available. This also may cause a service interruption if the scanning process uses the same channel as for data traffic exchange. (3) Proactive handover has its limits in terms of how fast the mobile units 161, 162, and 163 can move. If some signaling exchanges were delayed until handover is imminent, there would be no guarantee that the exchanges would complete, especially in a radio environment where the connection to the old PoA is deteriorating rapidly. (4) Finally, proactive handover usually requires high signaling overhead. In future IPv6 mobile systems, the number of nodes will be high and then the overhead will also be high. To complicate matters, many moving MUs can cause considerable signaling overhead.

In contrast to proactive handover, reactive handover allows a network layer handover to be initiated in response to a termination of a link layer handover. A mobile unit or its old PoA/old AR does not have prior information about the new PoA/AR to which the MU moves to. Usually, a reactive handover scheme is simple and robust. With a reactive handover scheme, however, since the network layer handover starts after the link layer handover, heavy packet loss occurs. Therefore, some reactive handover proposals, such as Handoff-Aware Wireless Access Internet Infrastructure (HA-WAII), have utilized packet buffering at the old PoA (or AR) once the MU is recognized as being out of range. Bi-casting mechanism has been used in other reactive handover proposals, such as Intra-domain Management Protocol (IDMP), Cellular IP and Multicast-based Mobility protocol (M&M). However, such buffering and bi-casting mechanisms impose much burden on network devices and wireless/wired network. HAWAII, Cellular IP, and M&M can also support soft handover by using the scheme that some MUs can simultaneously receive packets from the new and old PoAs during handover. However, since all wireless technologies do not have simultaneous connection capability, it is difficult to adapt the soft handover to a wireless network.

FIG. 2 is a timing diagram illustrating a handover procedure in a hierarchical MIPv6 (HMIPv6) according to a conventional technology.

HMIPv6 separates mobility management into micro mobility management and macro mobility management. The micro mobility management manages a case in which a subnet is changed in the same domain, and the macro mobility management manages a case in which a domain is changed. One domain is managed by a mobile anchor point (MAP), and one subnet is managed by an access router (AR). Each domain includes at least one subnet.

The ARs 141 and 142 periodically send an unsolicited router advertisement (RA) message to all mobile units 161, 162, and 163 of a subnet of the ARs 141 and 142. The unsolicited router advertisement (RA) message is a router advertisement (RA) message sent by the ARs 141 and 142 without receiving a solicitation. Accordingly, the mobile units 161, 162, and 163 receive the router advertisement (RA) message at every certain period. When the mobile units 161, 162, and 163 do not receive the router advertisement (RA) message for a certain period, the mobile units 161, 162, and 163 sends a router solicitation (RS) message to a multicast address of the ARs 141 and 142 (201).

The ARs 141 and 142 receiving the router solicitation (RS) message sends the router advertisement (RA) message to multicast addresses with respect to all nodes (202). The router advertisement (RA) message includes network prefixes of the ARs 141 and 142 sending the router advertisement (RA) message. Accordingly, the MUs 161, 162, and 163 receiving the router advertisement (RA) message determine whether an intra-domain movement exists by comparing the network prefix of their on-link care of address (LCoA) with the network prefix included in the router advertisement (RA) message. Also, since the router advertisement (RA) message includes a MAP option, the MUs 161, 162, and 163 may determine whether inter-domain movement exists from the MAP option. Since the MAP option includes the network prefix of the MAP, whether the inter-domain movement exists may be determined by comparing the network prefix of the MAP with the regional care of addresses (RCoAs) of the MUs 161, 162, and 163. The method described above that determines whether a MU move is known as movement detection (MD).

When the MUs 161, 162, and 163 receive the router advertisement (RA) message from the ARs 141 and 142, the movement may be confirmed. However, since a router solicitation (RS) message collision occurs when the MUs 161, 162, and 163 receive the router advertisement (RA) message from the ARs 141 and 142 at the same time as the router solicitation (RS) message, the ARs 141 and 142 send or receive the router advertisement (RA) message after a random delay time from 0 seconds to MAX_RA_DELAY_TIME.

Thus, according to the conventional method proposed by the HMIPv6 protocol, a significant amount of time is required for MD. In particular, since an amount of time required for processing a handover becomes large in proportion to an amount of time required for MD, there are many problems when the conventional method is used in real-time applications such as VoIP.

After completing the MD procedure, the MUs 161, 162, and 163, whose movement is detected, generate their LCoA by using the network prefix included in the router advertisement (RA) message received from the ARs 141 and 142. The MUs 161, 162, and 163 send a neighbor solicitation (NS) message including their LCoA. If a MU using the LCoA previously exists, a corresponding node sends a neighbor advertisement (NA) message (203). The MUs 161, 162, and 163 delay for a predetermined time, an RT time after sending or receiving the neighbor solicitation (NS) message. This is performed as a predetermined time (DTime). When the neighbor advertisement (NA) message is not received, a duplicate address does not exist. The MUs 161, 162, and 163 use the LCoA as their addresses. This is known as duplicate address detection (DAD) procedure. Since the DAD procedure requires a significant amount of time, the amount of time required for processing the handover becomes large. Particularly, many problems occur when using the method in real time applications such as VoIP.

When the DAD procedure is finished, the MUs 161, 162, and 163 send a local binding update (LBU) message including their LCoA and RCoA to the MAPs 131 and 132 (204). The local binding update (LBU) message binds the RCoA with the LCoA. In the case of intra-domain movement, the MAPs 131 and 132 receiving the local binding update (LBU) message send a binding acknowledgment (BAck) message to the MUs 161, 162, and 163 (205). In the case of inter-domain movement, the MAPs 131 and 132 perform the DAD procedure with respect to a new RCoA (206) and send the binding acknowledgment (BAck) message to the MUs 161, 162, and 163 (207).

When the binding acknowledgment (BAck) message is received from the MAP 131 and 132, the MUs 161, 162, and 163 send a binding update (BU) message to the HA 121 and CNs (208). The binding update (BU) message binds a HoA with an RCoA. The HoA is a static address assigned to each of the MUs 161, 162, and 163. Other external nodes may communicate with a MU of a HoA by using the HoA. When a MU moves within the same domain, the RCoA is not changed. Accordingly, the MUs 161, 162, and 163 send the binding update (BU) message to the HA 121 and the CNs when the MAP domain is changed.

As described above, since the described MD and DAD procedures require a significant amount of time, and a significant amount of time is required for processing a handover, there are many problems to apply this method to real time applications such as VoIP.

Accordingly, there is a need for an improved apparatus that requires less time for processing a handover that supports real time applications.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus for providing simple, reliable, and robust reactive handover without depending on prediction information, buffering, bi-casting mechanisms, and soft handover.

An aspect of exemplary embodiments of the present invention also provides an apparatus for significantly reducing a signaling load and handover latency in a mobile network to support real time applications.

An aspect of exemplary embodiments of the present invention also provides an apparatus for reducing time required for a complete handover by reducing time required for movement detection (MD) and duplicate address detection (DAD) procedures.

An aspect of exemplary embodiments of the present invention also provides an apparatus for maintaining an end-to-end policy with respect to a handover scheme.

According to an aspect of exemplary embodiments of the present invention, there is provided an access router, in which a message receiver receives a new connection notification message from a point of attachment when the point of attachment makes a new connection with a mobile unit; and a message transmitter sends a router advertisement (RA) message to the mobile unit in response to receiving the new connection notification message.

In an exemplary implementation, the new connection notification message may include a link layer address of the mobile unit. Also, the message transmitter may send the router advertisement (RA) message to the mobile unit by using the link layer address of the mobile unit.

In another exemplary implementation, the router advertisement (RA) message may include a unique address option including a new on-link care of address (LCoA) assigned to the mobile unit.

According to another aspect of exemplary embodiments of the present invention, there is provided a mobile anchor point, in which a message receiver receives a local binding update (LBU) message including a new LCoA assigned to a mobile unit from an access router; and a message transmitter sends a binding acknowledgment (BAck) message to the mobile unit in response to the local binding update (LBU) message.

In an exemplary implementation, when the local binding update (LBU) message includes an indicator indicating that inter-domain handover of the mobile unit has occurred, the message transmitter may send the mobile unit the binding acknowledgment (BAck) message including a new RCoA assigned to the mobile unit.

In another exemplary implementation, when the local binding update (LBU) message does not include an indicator indicating that inter-domain handover of the mobile unit has occurred, the message transmitter may send the binding acknowledgment (BAck) message and a data packet to the mobile unit.

According to still another aspect of exemplary embodiments of the present invention, there is provided a point of attachment, in which an address storage unit stores an address of an access router having a connection with the point of attachment; and a controller sends a new connection notification message to the access router after establishing a connection with a mobile unit. The controller may send the new connection notification message to the access router after the point of attachment establishes a link layer connection with the mobile unit. The new connection notification message may include a link layer address of the mobile unit.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In the following description, two types of handovers will be described. One type of handover is an inter-domain handover and the other type of handover is an intra-domain handover. The intra-domain handover occurs when a mobile unit (MU) moves to a subnet of a new access router (AR) in one domain. Namely, the domain is not changed and there is a change of a subnet. In other words, a mobile anchor point (MAP) of the MU is not changed, and an AR of the MU is changed. When the MU moves to a new MAP domain, the inter-domain handover occurs. Namely, the MAP of the MU is changed.

Figure 1:
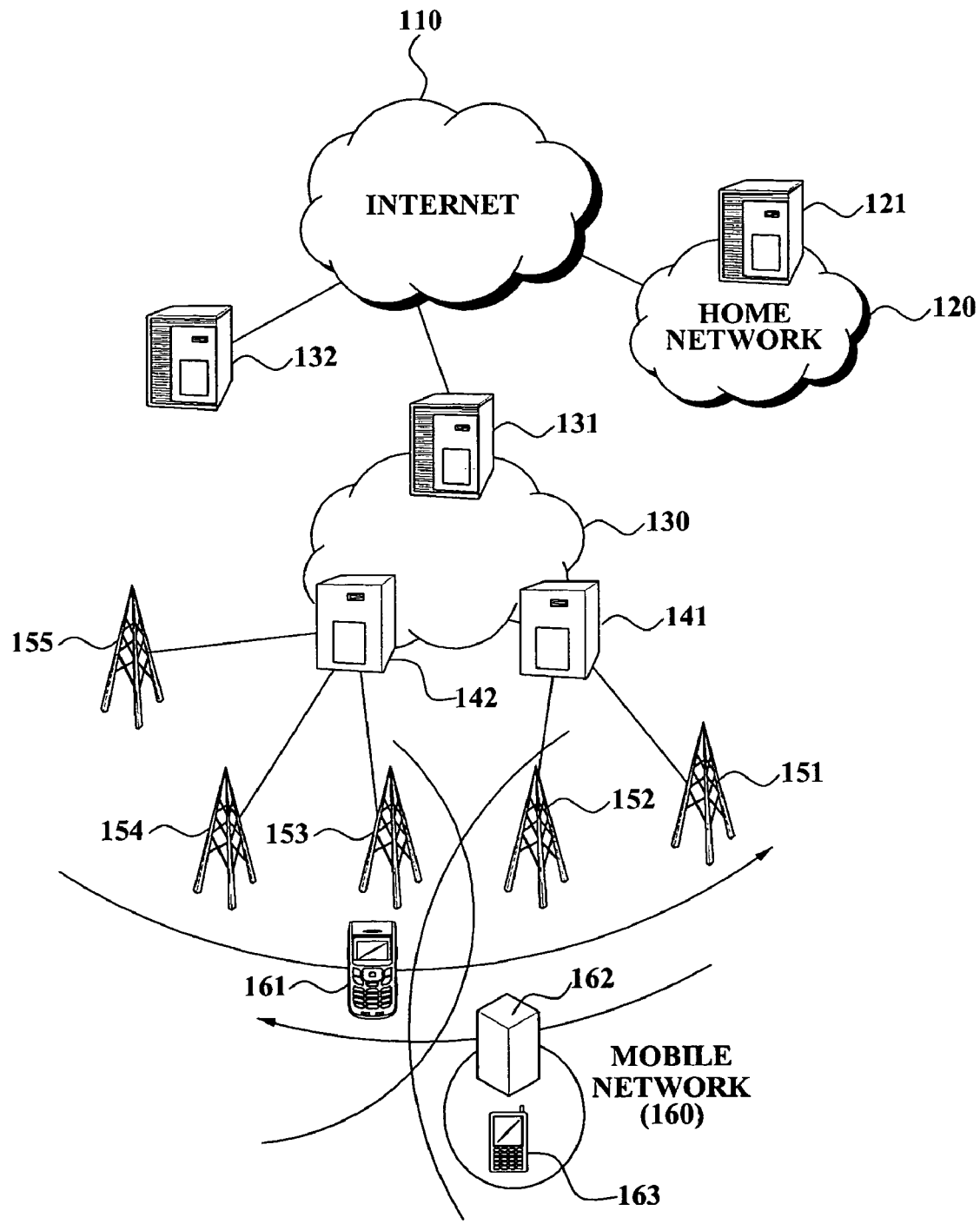
FIG. 1 is a diagram illustrating a conventional Mobile IPv6 network.
Figure 2:
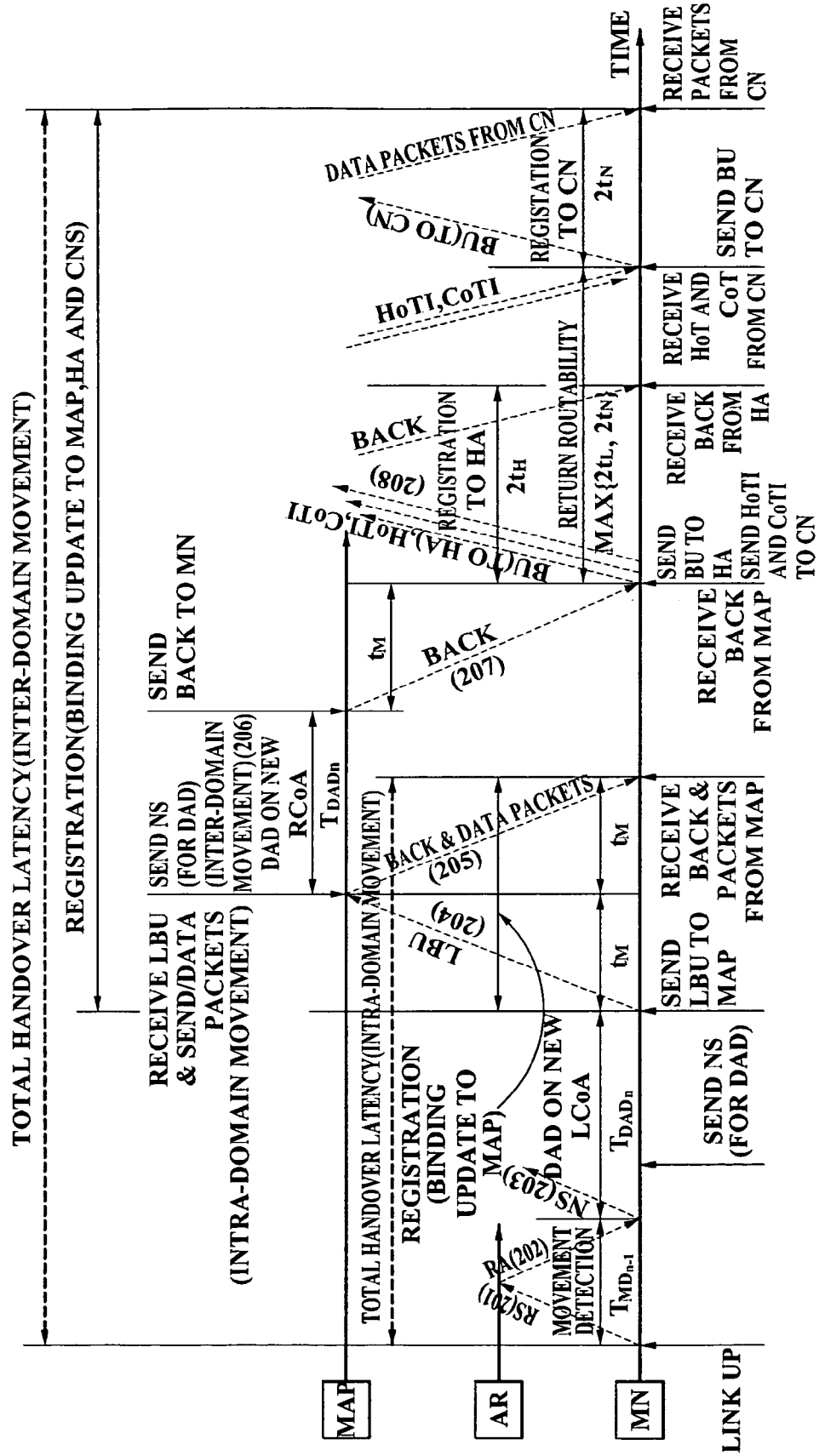
FIG. 2 is a timing diagram illustrating a handover procedure in a hierarchical MIPv6 according to a conventional technology.
Figure 3:
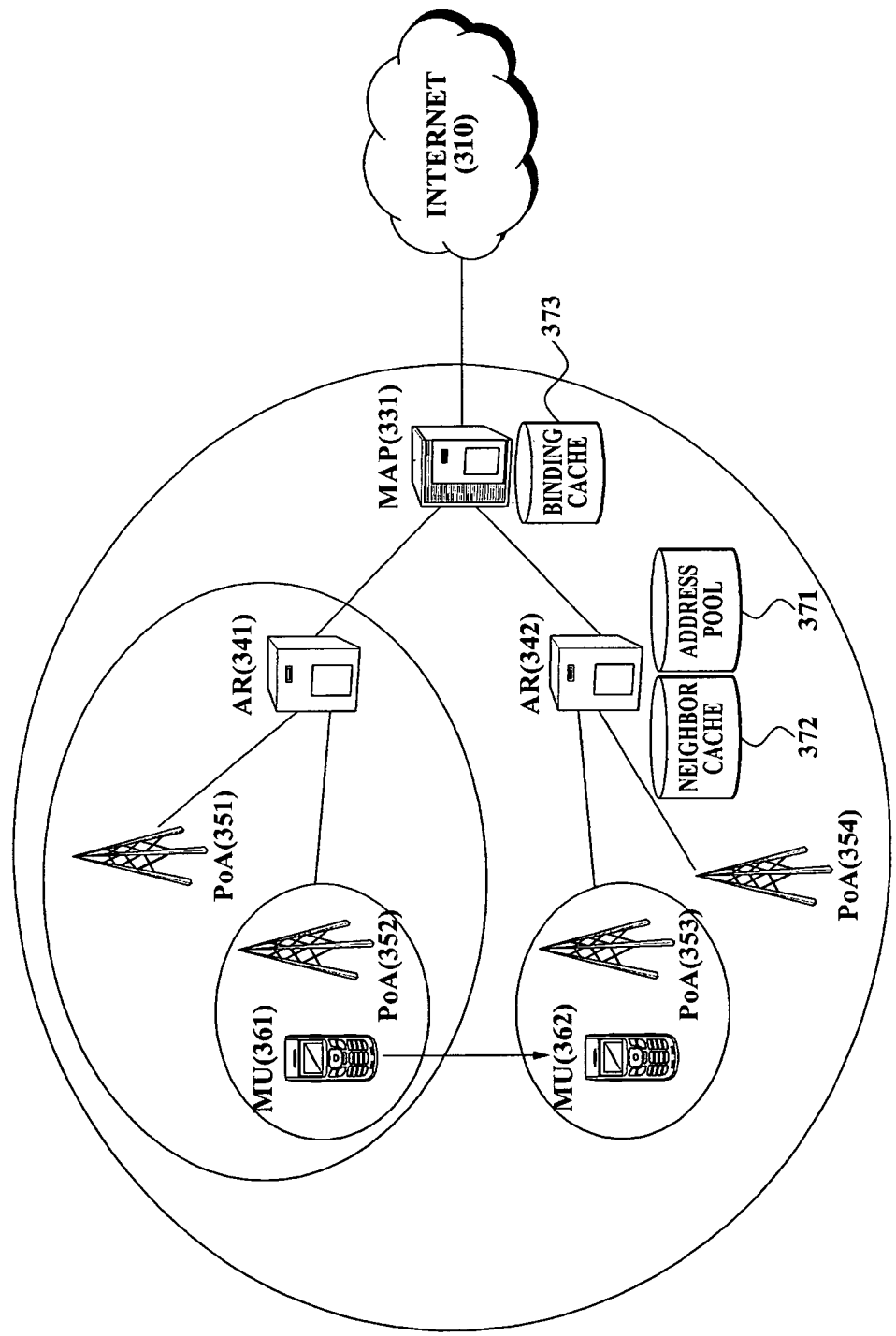
FIG. 3 is a configuration diagram illustrating an example of a network for processing a handover when a mobile unit moves in a domain according to an exemplary embodiment of the present invention.

FIG. 3 is a configuration diagram illustrating an example of a network for processing a handover when a MU moves within a domain according to an exemplary embodiment of the present invention.

When MUs 361 and 362 establish new link layer connections, subnets may be changed. For example, the MUs 361 and 362 are not updated as to whether their present IP configurations are still available for Internet connection. The MUs 361 and 362 also are not updated as to whether their present default router exists in this link or whether their neighbor cache entry is available. To clearly determine this, the MUs 361 and 362 have to quickly ascertain whether to change the subnet.

Points of attachment (PoAs) 351, 352, and 353 include an address storage unit storing an address of an AR connected with each of them, respectively. In FIG. 3, the PoAs 351 and 352 store an address of an AR 341, and the PoA 353 stores an address of an AR 342.

When the MUs 361 and 362 establish a new connection with the PoAs 351, 352, and 353, the MUs 361 and 362 send their domain network prefixes in link layer management frames, used for establishing a connection with the new PoAs 351, 352, and 353, to message receivers of the new PoAs 351, 352, and 353.

The domain network prefix is a network prefix for identifying a domain network, constructed by 64 bits. One domain is managed by a MAP. In FIG. 3, the ARs 341 and 342, the PoAs 351, 352, and 353, and the MUs 361 and 362 are included in the same domain. The domain is managed by a MAP 331. In each domain, there is only one MAP. The MUs 361 and 362 have two addresses such as a regional care of address (RCoA) and on-link care of address (LCoA). The RCoA is a domain level address, and the LCoA is a subnet level address. Accordingly, a network prefix of the RCoA is a domain network prefix of a corresponding MU. The MUs 361 and 362 may extract their domain network prefixes from their RCoAs to send to the PoAs 351, 352, and 353 or may send their RCoAs to the PoAs 351, 352, and 353. RCoAs of devices included in one domain are managed by the MAP 331 of the domain.

When the MUs 361 and 362 establish the new connection with the PoAs 351, 352, and 353, controllers of the PoAs 351, 352, and 353 send a new connection notification message to the ARs 341 and 342 connected with them. For example, when the MU 362 establishes a new connection with the PoA 353, the PoA 353 sends a new connection notification message to the AR 342. When the MUs 361 and 362 establish the new connection with the PoAs 351, 352, and 353, link layers of the PoAs 351, 352, and 353 may instantly detect the new connection. Accordingly, after the link layer connections between the MUs 361 and 362 and the PoAs 351, 352, and 353 are established, the PoAs 351, 352, and 353 instantly send the new connection notification message to the ARs 341 and 342 connected with them, thereby quickly starting a movement detection (MD) procedure. In a conventional method, to start the MD procedure, a router advertisement (RA) message has to be sent several times. However, in an exemplary embodiment of the present invention, by taking advantage of a link layer notification, the MD procedure may be quickly started and an amount of time required for a handover may be reduced. Since the PoA 353 stores an address of the AR 342 connected with the PoA 353 in the address storage, the new connection notification message may be instantly sent to the AR 342.

The new connection notification message includes link layer addresses of the MUs 361 and 362 establishing the new connection with the PoAs 351, 352, and 353 and RCoAs of the MUs 361 and 362. Since the PoAs 351, 352, and 353 establish the link layer connection with the MUs 361 and 362, the link layer addresses of the MUs 361 and 362 are known to the PoAs 351, 352, and 353. For example, when the MU 362 establishes a new connection with the PoA 353, the PoA 353 sends a new connection notification message including the link layer address of the MU 362 and the RCoA of the MU 362 to the AR 342.

As described above, the PoAs 351, 352, and 353 establish the new connection with the MUs 361 and 362, the message receivers of the ARs 341 and 342 receive the new connection notification message from the PoAs 351, 352, and 353. The new connection notification message includes the link layer addresses of the MUs 361 and 362 establishing the new connection with the PoAs 351, 352, and 353 and the RCoAs of the MUs 361 and 362.

The ARs 341 and 342 include an address pool 371 storing a plurality of candidate LCoAs. The LCoA is the subnet level address. In each subnet, there is one AR. LCoAs of devices included in one subnet are managed by the AR of the subnet. In FIG. 3, the PoAs 351 and 352 and the MU 361 are included in the same subnet that is managed by the AR 341. Also, separately from the subnet, the PoA 353 and the MU 362 are included in another subnet that is managed by the AR 342.

The plurality of candidate LCoAs stored in the address pool 371 may be generated via a procedure described below. The ARs 341 and 342 generate a plurality of LCoAs including a subnet network prefix of a subnet where the ARs 341 and 342 are included. The ARs 341 and 342 perform duplicate address detection (DAD) with respect to the generated plurality of LCoAs. The DAD is performed by determining whether a duplicated address exists among devices in the subnet where the ARs 341 and 342 are included, and the generated plurality of LCoAs. LCoAs determined by the DAD procedure, as not duplicated, are stored in the address pool 371 as the candidate LCoAs.

The ARs 341 and 342 assign new LCoAs to the MUs 361 and 362 establishing the new connection with the PoAs 351, 352, and 353, in response to receiving the new connection notification message. The ARs 341 and 342 determine a new LCoA that will be assigned to the MUs 361 and 362 by selecting one of the plurality of candidate LCoAs stored in the address pool 371. The ARs 341 and 342 then delete the new LCoA assigned to the MUs 361 and 362, from the address pool 371.

According to the conventional method, the MUs 361 and 362 generate an LCoA, and determining whether the generated LCoA is unique requires communicating with an AR and other MUs. In an exemplary embodiment of the present invention, the LCoA is assigned by selecting a unique candidate LCoA from the address pool 371, thereby reducing an amount of time required for the DAD procedure.

The controllers of the ARs 341 and 342 store the link layer address of the MUs 361 and 362 and the new LCoA assigned to the MUs 361 and 362 in a neighbor cache 372. Referring to the neighbor cache 372, the ARs 341 and 342 may send messages whose destination is the LCoA to the corresponding MU by using the link layer addresses of the corresponding MU.

Message transmitters of the ARs 341 and 342 send router advertisement (RA) messages to the MUs 361 and 362, in response to receiving the new connection notification message. The new LCoAs assigned to the MUs 361 and 362 are included in unique address options of the router advertisement (RA) messages. The message transmitters send the router advertisement (RA) messages directly to the MUs 361 and 362 by using the link layer addresses of the MUs 361 and 362.

Namely, the message transmitters send the router advertisement (RA) message by assigning the link layer address of the MUs 361 and 362 into a link layer's destination address of the router advertisement (RA) message and by assigning an all-node multicast address into a network layer's destination address of the router advertisement (RA) message. The link layer addresses of the MUs 361 and 362 are included in the new connection notification messages and sent to the ARs 341 and 342.

In an aspect of exemplary embodiments of the present invention, the ARs 341 and 342 send the router advertisement (RA) messages by a unicast method by assigning the link layer addresses of the MUs 361 and 362 into the link layer destination addresses of the router advertisement (RA) message. In some current wireless link layer technologies, a multicast address is not recognized. An aspect of exemplary embodiments of the present invention sends the router advertisement (RA) message to the MUs 361 and 362 by the unicast method, thereby being applicable to those wireless link layer technologies in which the multicast address is not recognized. Thus, according to an aspect of exemplary embodiments of the present invention, a more reliable communication is possible.

The MUs 361 and 362 receiving the router advertisement (RA) messages from the ARs 341 and 342 determine whether the MUs 361 and 362 move within a domain (that is, intra-domain movement), from the network prefixes of the new LCoAs included in the router advertisement (RA) messages. For example, the MUs 361 and 362 compare the network prefixes of their LCoAs with the network prefixes of the new LCoAs. If the network prefixes of their LCoAs are identical with the network prefixes of the new LCoAs, a subnet change does not exist. For example, a new connection with a new PoA is established but the subnet is the same. If the network prefixes of their LCoAs are not identical to the network prefixes of the new LCoAs, the MUs 361 and 362 have moved to another subnet in the same domain. That is, the MUs 361 and 362 have moved to a subnet included in other ARs. In an exemplary implementation, the MUs 361 and 362 assign the new LCoAs as their LCoAs.

While the ARs 341 and 342 send the router advertisement (RA) messages to the MUs 361 and 362, the controllers of the ARs 341 and 342 compare the domain network prefixes of the MUs 361 and 362 with the domain network prefixes assigned to the ARs 341 and 342. The new connection notification message, received from the PoAs 351, 352, and 353 by the ARs 341 and 342, include RCoAs of the MUs 361 and 362 with which the PoAs 351, 352, and 353 establish the new connection. Accordingly, the ARs 341 and 342 may extract the domain network prefixes of the MUs 361 and 362 from the RCoAs of the MUs 361 and 362, included in the new connection notification messages.

The ARs 341 and 342 determine whether MUs 361 and 362 move to another domain (that is, inter-domain movement) by comparing the domain network prefixes of the MUs 361 and 362 and the domain network prefixes assigned to the ARs 341 and 342.

When the domain network prefixes of the MUs 361 and 362 are corresponding to the domain network prefixes of the ARs 341 and 342, the MUs 361 and 362 move within the domain and have not moved outside the domain. The movement of MUs 361 and 362 is not an inter-domain movement, but an intra-domain movement. In an exemplary implementation, the message transmitters of the ARs 341 and 342 send local binding update (LBU) messages to the MAP 331. The MAP 331 is connected to the Internet 310. The local binding update (LBU) messages include the RCoAs of the MUs 361 and 362 and the new LCoAs assigned to the MUs 361 and 362.

The MAP 331 receiving the local binding update (LBU) messages updates a binding cache 373 of the MUs 361 and 362, maintained by the MAP 331, by the RCoAs of the MUs 361 and 362 and the new LCoAs assigned to the MUs 361 and 362. The MAP 31 sends a binding acknowledgment (BAck) message and/or a data packet to the MUs 361 and 362 by using the new LCoAs. A controller of the MAP 331 stores the RCoAs and new LCoAs of the MUs 361 and 362 in binding cache 373. The RCoAs of the MUs 361 and 362 are included in the local binding update (LBU) messages sent to the MAP 331. At this point, the handover is complete.

According to an exemplary embodiment of the present invention, when the MUs 361 and 362 do not receive data packets after receiving the router advertisement (RA) message including the unique address option, the MUs 361 and 362 send the local binding update (LBU) messages directly to the MAP 331. Accordingly, recovery is possible even though the data packets are not sent to the MUs 361 and 362 due to some problem of network.

Hereinafter, a case in which the MU 361 moves from the subnet of the AR 341 to the subnet of the AR 342 in the same domain will be described.

When the MU 362 moves, the MU 362 establishes a new connection with the PoA 353. The PoA 353 sends a new connection notification message including the link layer address and the RCoA of the MU 362 to the AR 342.

When receiving the new connection notification message, the AR 342 selects a new LCoA from the address pool 371 and assigns the new LCoA to the MU 362. The new LCoA and the link layer address of the MU 362 are stored in the neighbor cache 372. The AR 342 sends a router advertisement (RA) message including the new LCoA to the MU 362. The AR 342 extracts a domain network prefix of the MU 362 from the received RCoA of the MU 362. The AR 342 determines whether intra-domain movement or inter-domain movement occurs by comparing the domain network prefix of the MU 362 with the domain network prefix assigned to the RA 342.

When the intra-domain movement occurs (MU 362 has moved to another subnet within the domain), the AR 342 sends a local binding update (LBU) message to the MAP 331. The local binding update (LBU) message includes the RCoA of the MU 362 and the new LCoA assigned to the MU 362. The MAP 331 receiving the local binding update (LBU) message updates the binding cache 373 of the MU 362 with the RCoA of the MU 362 and the new LCoA assigned to the MU 362. When an indicator indicating that the inter-domain movement occurs is not included in the local binding update (LBU) message, the indicator designates that the intra-domain movement occurs. The MAP 331 sends a binding acknowledgment (BAck) message and/or a data packet to the MU 362. At this point, the handover is complete.

Figure 4:
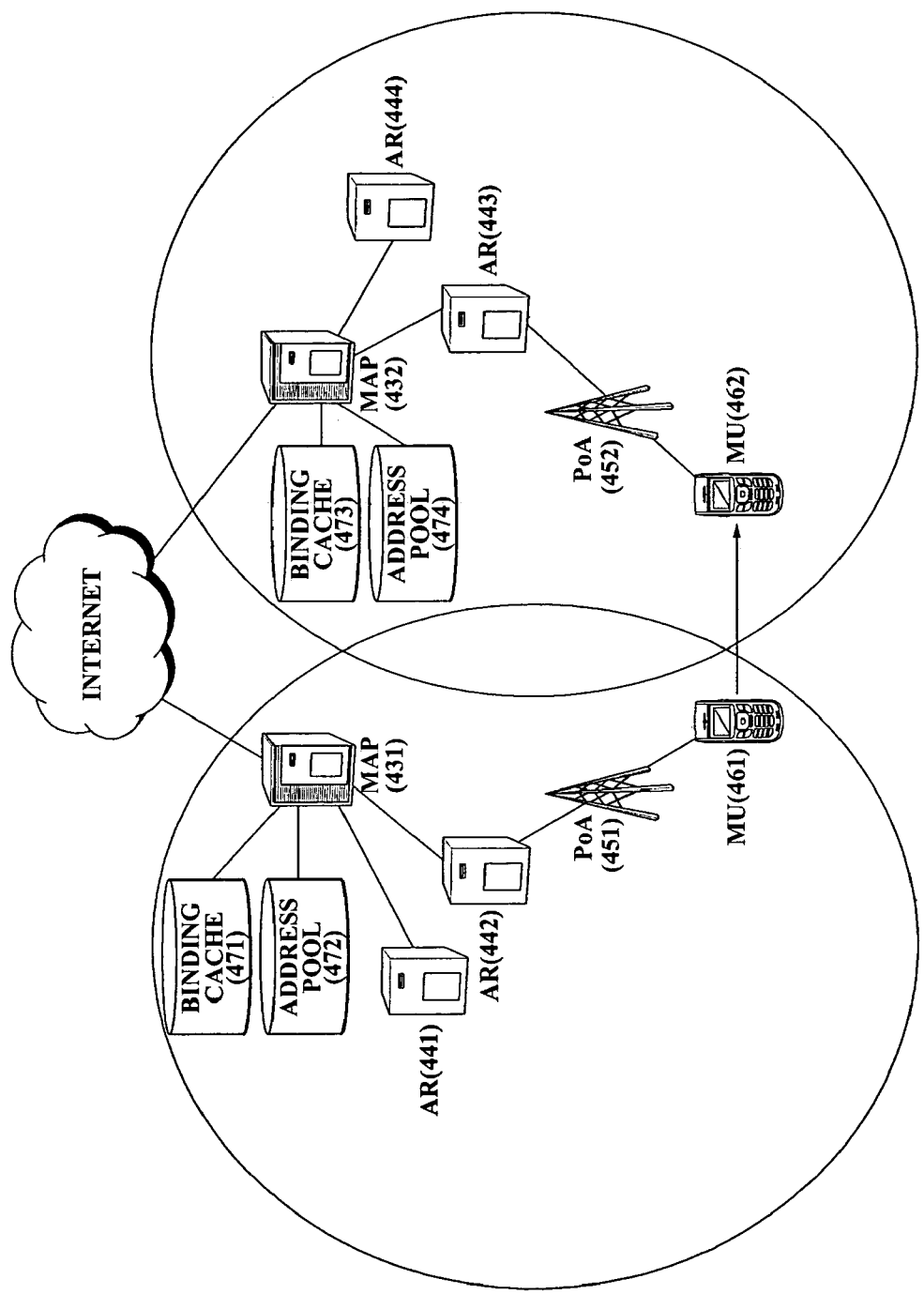
FIG. 4 is a configuration diagram illustrating an example of a network for processing a handover when a mobile unit moves between domains according to an exemplary embodiment of the present invention.

FIG. 4 is a configuration diagram illustrating an example of a network for processing a handover when an inter-domain handover occurs according to an exemplary embodiment of the present invention.

ARs 441, 442, 443, and 444 determine whether intra-domain movement or inter-domain movement occurs by comparing domain network prefixes of the MUs 461 and 462 with domain network prefixes assigned to the ARs 441, 442, 443, and 444. When the domain network prefixes of the MUs 461 and 462 are not identical to the domain network prefixes assigned to the ARs 441, 442, 443, and 444, it designates that the inter-domain movement occurs.

When inter-domain movement occurs, message transmitters of the ARs 441, 442, 443, and 444 send local binding update (LBU) messages to MAPs 431 and 432. The local binding update (LBU) messages include indicators indicating that an inter-domain handover occurs and new LCoAs are assigned to the MUs 461 and 462.

When message receivers of the MAPs 431 and 432 receive the local binding update (LBU) messages from the ARs 441, 442, 443, and 444, message transmitters of the MAPs 431 and 432 send binding acknowledgment (BAck) messages to the MUs 461 and 462. Since the local binding update (LBU) messages sent to the MAPs 431 and 432 include the new LCoAs assigned to the MUs 461 and 462, the MAPs 431 and 432 may send the binding acknowledgment (BAck) messages to the MUs 461 and 462 with the new LCoAs.

When the indicator indicating that the inter-domain movement occurs is included in the local binding update (LBU) messages sent to the MAPs 431 and 432, the MAPs 431 and 432 determine that the MUs 461 and 462 move between domains. In an exemplary implementation, the message transmitters of the MAPs 431 and 432 send the binding acknowledgment (BAck) messages including new RCoAs assigned to the MUs 461 and 462, to the MUs 461 and 462. The MUs 461 and 462 receiving the new RCoAs assign the new RCoAs to their interfaces.

The MAPs 431 and 432 include address pools 472 and 474 storing a plurality of candidate RCoAs. The RCoA is a domain level address. In each domain, there is only one MAP.

The RCoAs of each device included in one domain are managed by the MAP of the domain. In FIG. 4, the ARs 441 and 442, a PoA 451, and the MU 461 are included in the same domain, and the domain is managed by the MAP 431. Also, separately from the domain. The ARs 443 and 444, a PoA 452, and the MU 462 are included in another domain, and the domain is managed by the MAP 432.

The plurality of candidate RCoAs stored in the address pools 472 may be generated via a procedure described below. The MAP 431 generates a plurality of RCoAs including domain network prefix of the domain where the MAP 431 is included. The MAP 431 performs a DAD procedure with respect to the generated plurality of RCoAs. The DAD procedure is performed by determining whether a duplicate address exists among the generated plurality of RCoAs and the RCoAs assigned to the devices of the domain where the MAP 431 is included. The RCoAs that are determined to not be duplicated by the DAD procedure and unused by the device of the domain are stored in the address pools 472 as the candidate RCoAs. The MAP 432 also stores a plurality of candidate RCoAs in the address pools 474.

In response to receiving the local binding update (LBU) messages including the indicators indicating that the inter-domain movement occurs, the MAPs 431 and 432 assign the new RCoAs to the MUs 461 and 462 establishing new connections with the PoAs 451 and 452. The MAPs 431 and 432 determine the new RCoAs which will be assigned to the MUs 461 and 462 by selecting one of the plurality of candidate RCoAs stored in the address pools 472 and 474. The MAPs 431 and 432 delete the new RCoAs assigned to the MUs 461 and 462 from the address pools 472 and 474. Controllers of the MAPs 431 and 432 store the new RCoAs and the new LCoAs of the MUs 461 and 462 in binding caches 471 and 473.

After assigning the new RCoAs to their interfaces, the MUs 461 and 462 send binding update (BU) messages to their respective home agents. The home agents receiving the binding update (BU) messages update its binding cache with home addresses (HoAs) and the new RCoAs of the MUs 461 and 462. Similarly, the MUs 461 and 462 send the binding update (BU) messages to correspondent nodes (CNs).

Hereinafter, a case in which the MU 461 moves from the domain of the MAP 431 to the domain of the MAP 432 will be described.

When the mobile unit 462 moves from the domain of the MAP 431 to the domain of the MAP 432, a domain network prefix of the MU 462 is a domain network prefix of the domain of the MAP 431. Accordingly, when the AR 443 compares the domain network prefix of the MU 462 with a domain network prefix assigned to the AR 443, the two prefixes are not identical to each other. Accordingly, the AR 443 determines that the MU 462 moves between domains. The AR 443 sends a local binding update (LBU) message, including an indicator indicating that the MU 462 moves to another domain, to the MAP 432. The MAP 432 assigns a new RCoA to the MU 462 and sends a binding acknowledgment (BAck) message including the new RCoA to the MU 462.

Figure 5:
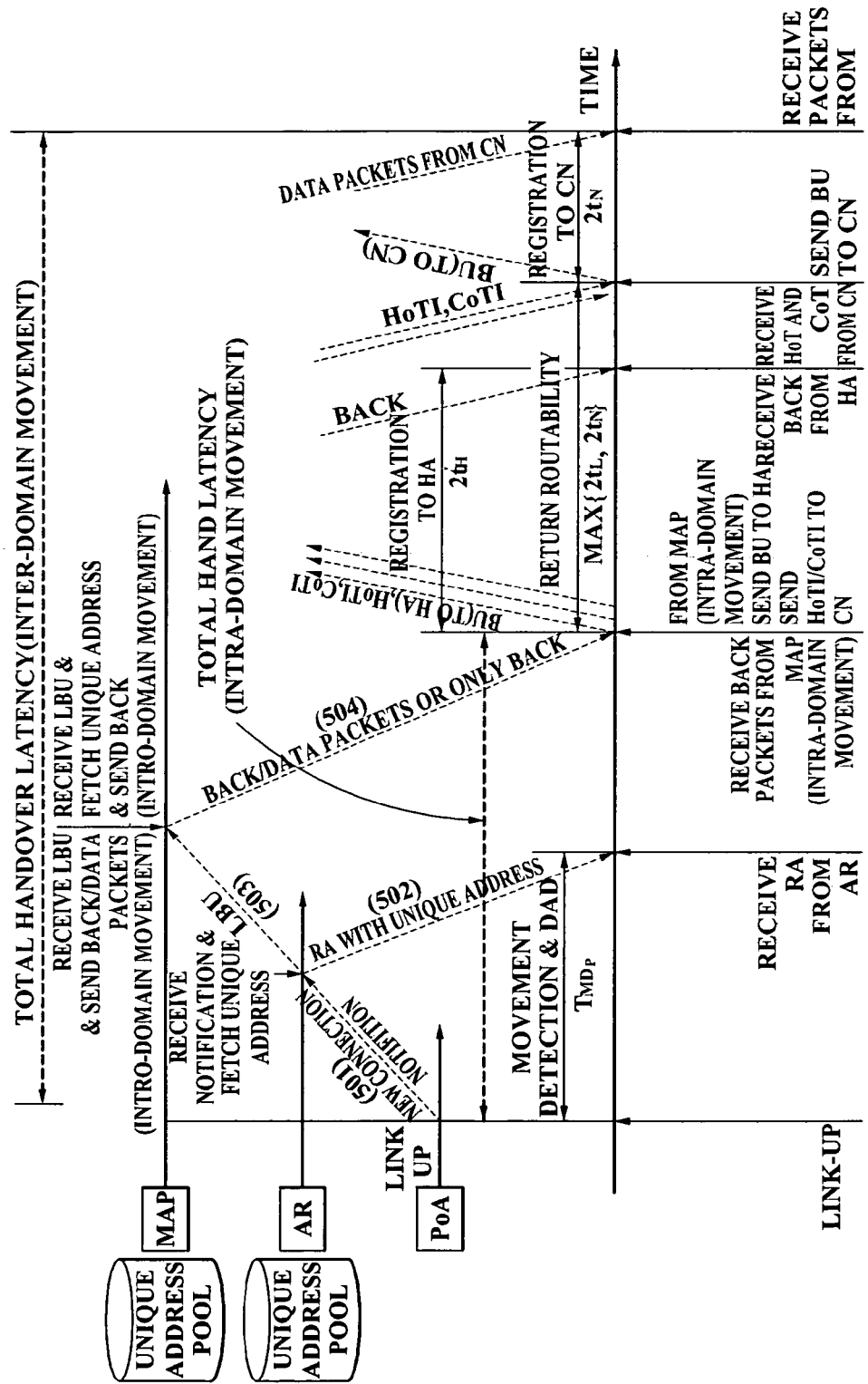
FIG. 5 is a timing diagram illustrating a procedure of processing a handover according to an exemplary embodiment of the present invention.

FIG. 5 is a timing diagram illustrating a procedure of processing a handover according to an exemplary embodiment of the present invention.

When a MU establishes a new connection with a PoA, the PoA sends a connection notification message to an AR connected with the PoA (501). The AR receiving the new connection notification message sends the MU a router advertisement (RA) message including an LCoA assigned to the MU (502). At the same time, the AR sends a local binding update (LBU) message to a MAP (503). If intra-domain movement occurs, The MAP sends a binding acknowledgment (BAck) message and a data packet to the MU in response to receiving the local binding update (LBU) message (504). If inter-domain movement occurs, the MAP sends the binding acknowledgment (BAck) message to the MU (504). Subsequent operations may be processed by the same method of a conventional technology using HMIPv6.

Referring to FIG. 5, MD and DAD procedures are performed at the same time, thereby reducing an amount of time required for a handover when compared to the conventional technology.

For example, considering a VoIP application, concealment techniques using G. 729 encoding are actually capable of concealing a packet loss of up to 60 ms when encoded at less than 20 ms per frame. Namely, a certain degree of packet loss does not have an effect on communication quality. According to an exemplary embodiment of the present invention, since a time required for a handover may be less than 60 ms, reactive handover may be used in real-time applications such as VoIP.

Also, the method and apparatus according to an exemplary embodiment of the present invention may provide a robust reactive handover without buffering, bi-casting mechanisms, or a soft handover. Namely, according to an exemplary embodiment of the present invention, without depending on prediction information, buffering, bi-casting mechanisms, or a soft handover, a simple, reliable, and robust handover may be performed.

Also, according to an exemplary embodiment of the present invention, signaling overhead is significantly reduced and handover latency is reduced, thereby supporting real-time applications. For example, according to an exemplary embodiment of the present invention, an amount of time required for the handover is reduced to be less than 60 ms, thereby being capable of performing reactive handover in real-time applications such as VoIP.

Also, according to an exemplary embodiment of the present invention, a new LCoA and a new RCoA are assigned to a MU by using an address pool, thereby reducing an amount of time required in a DAD procedure.

Also, according to an exemplary embodiment of the present invention, by taking advantage of link layer notification, a MD procedure may be quickly started and an amount of time required for handover may be reduced.

Currently, in some wireless link layer technologies, a multicast address cannot be recognized. According to an exemplary embodiment of the present invention, since a router advertisement (RA) message is sent to a MU by unicast method, a handover may be performed in the wireless link layer technologies in which the multicast address cannot be recognized, thereby being applicable to those wireless link layer technologies in which the multicast address is not recognized.

Also, according to an exemplary embodiment of the present invention, MD and DAD procedures are performed at the same time, thereby reducing an amount of time required for a handover when compared to conventional technologies performing the DAD procedure after performing the MD procedure.

Also, according to an exemplary embodiment of the present invention, an end-to-end policy may be as maintained with respect to a handover scheme.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An access router comprising:
 a message receiver for receiving a new connection notification message, the new connection notification message generated at a point of attachment in response to the point of attachment making a new link layer connection with a mobile unit and comprising a link layer address of the mobile unit and a regional care of address (RCoA) of the mobile unit;
 a controller for extracting a domain network prefix of the mobile unit from the RCoA of the mobile unit and determining whether the mobile unit moves to a new mobile anchor point (MAP) domain by comparing the domain network prefix of the mobile unit, which is extracted from the RCoA of the mobile unit, with a domain network prefix assigned to the access router; and
 a message transmitter for sending a router advertisement (RA) message to the mobile unit in response to receiving the new connection notification message,
 wherein the message transmitter sends the RA message to the mobile unit by using the link layer address of the mobile unit, and the RA message comprises a new on-link care of address (LCoA) assigned to the mobile unit.

2. The access router of claim 1, wherein the message transmitter sends the RA message by a unicast method by assigning the link layer address of the mobile unit into a link layer's destination address of the RA message.

3. The access router of claim 1, wherein the new LCoA is in a unique address option of the RA message.

4. The access router of claim 1, further comprising an address pool for storing a plurality of candidate LCoAs, wherein the new LCoA is selected from the plurality of candidate LCoAs.

5. The access router of claim 4, wherein the plurality of candidate LCoAs are LCoAs that have passed a duplicate address detection (DAD) procedure among a plurality of LCoAs generated by the access router.

6. The access router of claim 4, wherein the new LCoA is deleted from the address pool.

7. The access router of claim 1, wherein the controller stores the link layer address of the mobile unit and the new LCoA assigned to the mobile unit in a neighbor cache.

8. The access router of claim 1, wherein the message transmitter sends a local binding update (LBU) message, comprising the RCoA of the mobile unit and the new LCoA assigned to the mobile unit, to a mobility anchor point (MAP), when the domain network prefix of the mobile unit matches the domain network prefix assigned to the access router.

9. The access router of claim 1, wherein the message transmitter sends a local binding update (LBU) message, comprising an indicator indicating that inter-domain handover has occurred and the new LCoA assigned to the mobile unit, to the mobile anchor point, when the domain network prefix of the mobile unit does not match the domain network prefix assigned to the access router.

* * * * *